United States Patent Office
3,425,434
Patented Feb. 4, 1969

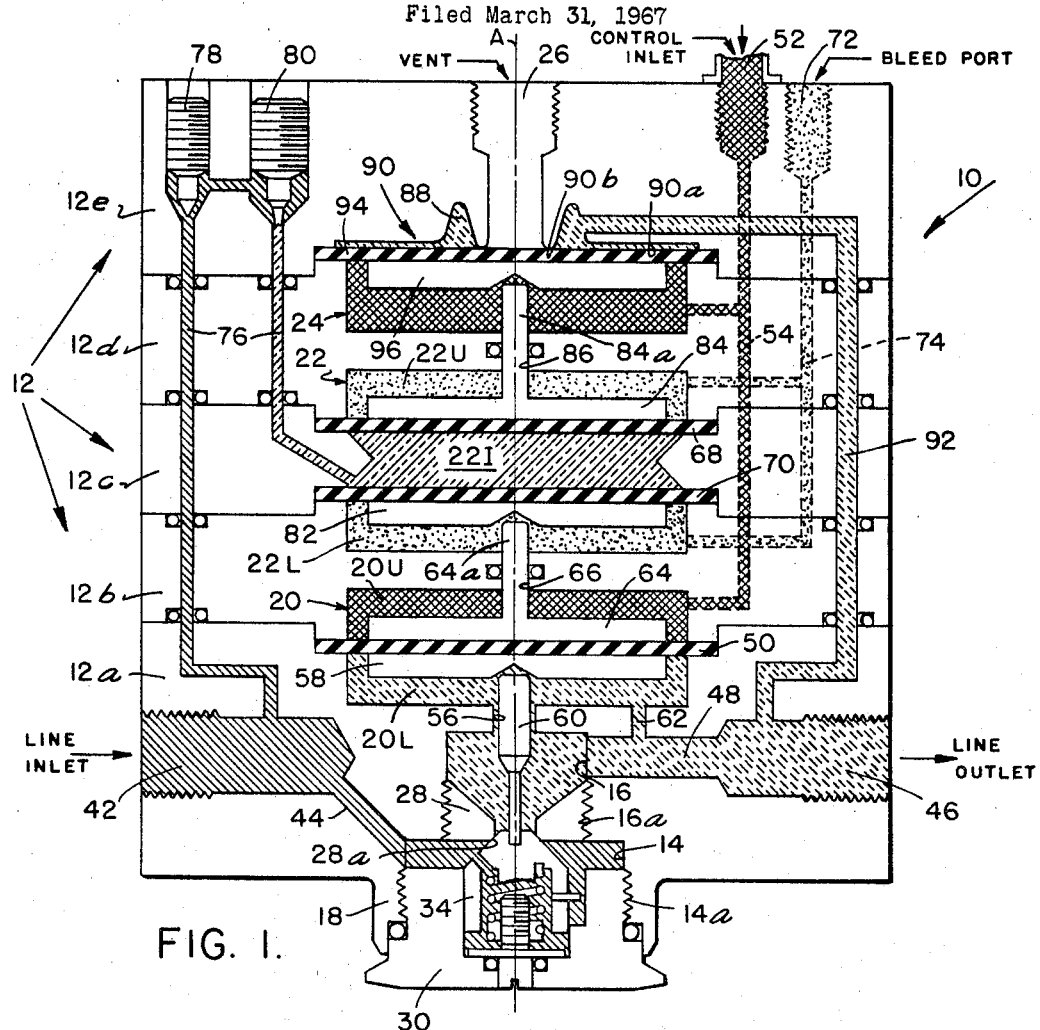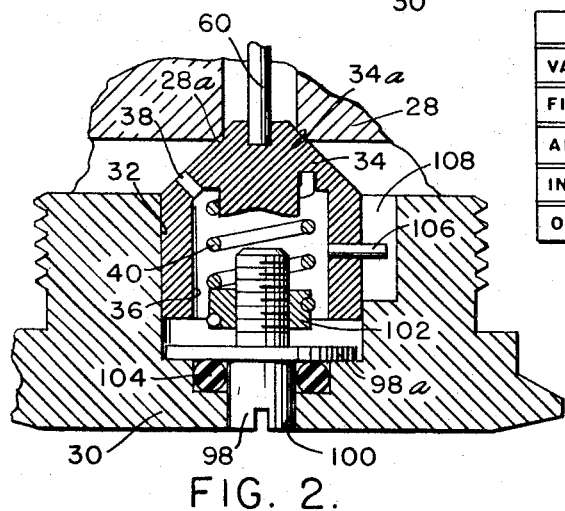

1

3,425,434
CONTROLLABLE, UNITARY REGULATOR AND RELIEF VALVE
Alvah T. Strickland, Arcadia, and William G. Wilson, Altadena, Calif., assignors to the United States of America as represented by the Secretary of the Navy
Filed Mar. 31, 1967, Ser. No. 628,239
U.S. Cl. 137—85                                    5 Claims
Int. Cl. G05 *13/34, 7/01;* F16k *17/168*

ABSTRACT OF THE DISCLOSURE

The invention is a unitary regulator valve and relief valve device, which is controllable to provide a selectively variable outlet pressure in accordance with a control pressure from an independent source. The regulator includes three axially aligned chambers which are sealed from one another, consisting of two outer chambers and a center chamber. One of the outer chambers has a diaphragm which is the actuator for the regulator valve with the device output pressure acting thereon against the control pressure. The other of the outer chambers has a diaphragm which is the actuator for the relief valve with the device's outlet pressure acting thereon against the control pressure. The center chamber has two axially spaced diaphragms with a bias pressure in the compartment formed therebetween, and with ambient pressure acting upon the outer sides of the diaphragms. Mechanical couplings transmit the bias pressure forces exerted against each of the center chamber diaphragms to the adjacent valve actuator diaphragm, with a direction of application of the force against that of the outlet pressure. The regulator valve includes a valve element which is spring loaded in a direction tending to close the valve. The resilience of the valve loading spring is adjustable, which provides an adjustment of the cracking pressure of the relief valve.

---

The invention described herein may be manufactured and used by or for the Government of the United States of America for governmental purposes without the payment of any royalties thereon or therefor.

This invention relates to a unitary pressure regulating valve and relief valve device for reducing and regulating the pressure of a high pressure gas source, and more particularly to a device which provides a reduced outlet pressure which may be selectively varied over a wide, continuous range of outlet pressures in response to a control pressure from an independent source.

A particular utility of the device is in systems for dispensing hydrodynamic drag reducing materials overboard from Naval torpedoes, which operate over a wide range of depths, and in which the high pressure gas source provides the dispensing power. Here, the dispensing system must work against a wide range of backpressures depending upon the depth of operation of the torpedo. The control pressure in this instance would be the hydrostatic pressure outside the torpedo.

An object of the invention is to provide a unitary pressure regulator valve and relief valve device which provides a selectively variable outlet pressure over a wide range of outlet pressures in linear response to an independent control pressure.

Another object is to provide a device in accordance with the previous objective in which the cracking pressure of the relief valve may be adjusted by means of a simple readily accessible screw adjustment.

A still further object is to provide a device in accordance with the first mentioned objective in which the single presetting operation calibrates the device in both its flow and relief modes of operation.

Other objects and many of the attendant advantages of this invention will be readily appreciated as the same becomes better understood by reference to the following detailed description when considered in connection with the accompanying drawings wherein:

FIG. 1 is a somewhat diagrammatic central section through valve apparatus forming the subject of the invention;

FIG. 1A shows a cross hatch code chart of the various pressures in the device of FIG. 1; and FIG. 2 is an enlarged detail of the adjustment screw feature in FIG. 1.

Referring now to the drawing, and in particular to FIG. 1, the subject of the invention is a regulator and relief valve device 10 for installation in a supply line from a pressure gas source to provide a reduced and regulated downstream pressure, and which additionally functions to selectively vary the downstream pressure in response to a control pressure from an independent pressure source. Device 10 comprises a cylindrical valve body 12 having an axis A and assembled from five axial sections 12$a$, 12$b$, 12$c$, 12$d$ and 12$e$. A pair of concentric bores 14 and 16 extend into the lowermost body section 12$a$ from its lower end face. Bore 14 is adjacent the lower face and has a collet 18 formed thereabout. Bore 16 is of smaller diameter and extends inwardly from the bottom of bore 14. Bores 14 and 16 have threads 14$a$ and 16$a$ extending from their respective outer ends, but stopping short of the respective bore bottoms. A regulator valve actuator chamber 20 is formed between complimentary cavities in the upper and lower faces of body sections 12$a$ and 12$b$; a bias chamber 22 is formed by a central opening in body section 12$c$ and complimentary cavities in the upper face of section 12$b$ and the lower face of section 12$d$; and a relief valve chamber 24 is formed by a cavity in the upper face of body section 12$d$. An axially aligned vent outlet 26 extends through body section 12$e$ between relief valve chamber 24 and the exterior of the valve body.

A regulator valve assembly is contained in bores 14 and 16 as follows. A valve seat ring 28 is threaded onto threads 16$a$. Ring 28 provides a constriction within the bore and forms a small frusto-conical valve seating surface 28$a$. A closure and pintle holding member 30 is threaded onto threads 14$a$. As best shown in FIG. 2, an axial pintle slide-bore 32 extends into member 30 from its upper face, which bore is adapted to receive a pintle member 34. The upper end of pintle 34 has a frusto-conical valving surface 34$a$ shaped to match valve seat 28$a$. Pintle 34 is hollow having a cylindrical cavity 36 extending thereinto from its bottom end. A small passage 38 extends between the exterior of the head of the pintle and cavity 36 providing a pressure balanced valve action, which is conventional in the art. A helical spring 40 under compression urges the pintle against the valve seat. The degree of compression of spring 40 is adjustable, and the details of the arrangement for adjusting same will be described in a later paragraph. Closure member 30 stops short of the upper end of bore 14, and the remaining space forms an inlet zone for the valving action. The high pressure line gas to be regulated is communicated to this inlet zone through an inlet port 42 formed in the side of the body 12 and an associated passage 44. The pressure reduction and regulation action is provided through the valve passage formed between valving surface 34$a$ and valve surface 28$a$ under movement of pintle 34 between different axial positions away from the valve seat. The gas flowing to this valving passage expands in the portion of bore 16 above valve seat ring 28. The expanded gases, which are at the desired reduced outlet pressure, are communicated to an outlet port 46 in the side of the body through an associated passage 48.

A flexible diaphragm 50 made of neoprene or other suitable material extends across the valve actuator chamber 20 dividing same into upper and lower compartments 20U and 20L. The periphery of the diaphragm 50 is sealingly clamped between the upper and lower faces of valve body sections 12a and 12b. Control pressure is communicated to compartment 20U from a control pressure inlet port 52 formed in the upper face of the valve body, via an associated passage 54. A slide bore 56 communicates the bottom of bore 16 and compartment 20L. A thrust plate 58 engages the lower side of diaphragm 50 and in turn abuts the upper end of a valve actuator rod 60 which extends through bore 56 and is suitably operatively connected to the upper end of pintle 34. A small sensing passage 62 communicates line gas at the outlet pressure from passage 48 into compartment 20L. The upper side of diaphragm 50 is engaged by a thrust plate 64 having an integral upstanding central stem portion 64a which slidingly and sealingly engages in a bore 66 between the upper end wall of chamber 20 and the lower end wall of chamber 22. The upper end of the stem projects into chamber 22.

Bias chamber 22 is divided into three compartments by a pair of diaphragms consisting of an upper diaphragm 68 and a lower diaphragm 70. These three compartments consist of an upper compartment 22U, an intermediate compartment 22I, and a lower compartment 22L. The peripheries of the diaphragms are sealingly clamped where attached to the chamber walls. The ambient pressure on the outside of body 12 is communicated to upper and lower compartments 22U and 22L through a bleed port 72 formed in the upper face of the body and an associated passage 74. A branch passage 76 containing two needle valve stations 78 and 80, extends from line fluid inlet port 42 to the intermediate compartment 22I of the bias chamber. Line fluid is admitted into the compartment 22I to charge same at a preset bias pressure. This is done by manipulation of the needle valve station 78 and 80 as an adjustment after device 10 is connected into the line. A thrust plate 82 engages the lower face of diaphragm 70, and it in turn is engaged by the end of stem 64a. The upper side of diaphragm 68 is engaged by a thrust plate 84 having an integral upstanding stem portion 84a which sealingly extends through a slide bore 86 leading into relief valve chamber 24.

An annular groove 88 is formed in the upper end wall 90 of relief valve chamber 24 about vent outlet opening 26. A passage 92 from a line outlet port 46 admits gas at the outlet pressure into this groove. The portion of end wall 90a surrounding groove 88 is somewhat recessed relative to the concentric protuberance 90b between groove 88 and the vent outlet 26. The amount of this recess is exaggerated in the drawing, being of the order of several thousandths of an inch in an operational embodiment. A diaphragm 94 has its outer peripheral edge clamped between body sections 12d and 12e and extends across chamber 24. In its equilibrium the diaphragm 94 is in nonsealing contact with outer portion 90a of the end wall, but the concentric protuberance 90b, however, does engage the upper face of diaphragm 94, forming a face seating valve element which valves flow from groove 88 to the vent opening 26. A thrust plate 96 engages the lower face of diaphragm 94, and in turn is abutted by the end of stem portion 84a. The control pressure is communicated into the portion of relief valve chamber 24 below the diaphragm by a branch from passage 54.

Details of the arrangement for adjusting the degree of compression of the valve spring 40 will now be described with reference to FIG. 2. A collared lead screw 98 is disposed at the bottom of cavity 32 in the closure and pintle holding member 30. Screw 98 has an integral, washer-like, collar 98a of approximately the same size as the cavity 32 formed thereon adjoining the screw head. A small opening 100 for receiving the screw head extends from the bottom of cavity 32 to the outer face of closure member 30, and the screw has its head disposed in opening 100 with the lower face of its collar bearing against the bottom of cavity 32. The threaded portion of the screw extends upwardly and has a lead nut 102 threaded thereon. The upper end of helical spring 40 is anchored to the pintle in a manner bearing thereagainst in thrust and preventing relative rotation therebetween. For example, the upper end of the spring may be wrapped about a downwardly projecting integral core of the pintle member with the tip of the spring inserted in a drilled hole, and the core peened to provide tight engagement, as shown in the drawing. The lower end of the helical spring is secured to lead nut 102 in a manner providing resilient engagement in thrust thereagainst and preventing relative rotation therebetween. For example, the nut may be caged within the spring and brazed in place. An O-ring 104 forms a gas tight seal between the lower face of collar portion 98a and the bottom of cavity 32. The screwdriver slot of lead screw 98 is accessible from the exterior of closure member 30. Pintle 34 is pinned against rotation by a laterally projecting pin 106 which rides in a vertical guide slot 108 formed in member 30. Since the pintle is restrained against rotation, and the upper end of helical spring 40 is also anchored to the pintle in a manner preventing relative rotation, turning lead screw 98 will cause the lead nut 102 to move up and down and vary the degree of compression of spring 40.

Prior to operation, the intermediate compartment 22I is charged to the bias pressure needed to provide the desired value of outlet pressure above the control pressure, as is well understood in the art of dome-type regulators.

Diaphragms 70 and 50 form a diaphragm system for actuating pintle 34. Diaphragm 70 has acting on its upper face of the bias pressure, while its lower face is subject to the ambient pressure on the outside of the body member 12. The force exerted on diaphragm 70 due to this pressure differential is transmitted to the upper face of diaphragm 50 in the regulator valve actuator chamber 20 through thrust plates 82 and 64. Acting on the upper face of diaphragm 50 is the control pressure and the force transmitted from diaphragm 70. The bottom face of diaphragm 50 is subject to the regulator outlet pressure. Any time the outlet pressure is below the sum of the bias pressure (gauge) and the control pressure, diaphragm 50 is deflected downwardly which actuates rod 60 to depress pintle 34 and thereby increase the size of the regulator valve passage cross-section area between the pintle valving surface 34a and the valve seal 28a. This in turn increases the flow of gas and the outlet pressure, providing a pressure equalizing action on the diaphragm system. The diaphragm system and pintle reach equilibrium when the outlet pressure equals the sum of the control and bias pressures.

Diaphragms 68 and 94 form a similar diaphragm system associated with relief valving of gas through the vent opening 26. The outlet pressure is fed to the upper side of diaphragm 94 through passage 92 and groove 88, and the summed bias and control pressure act on the lower face of this diaphragm. Diaphragm 94 is depressed when the outlet pressure becomes greater than the sum of the bias and control pressures, allowing gas to flow from groove 88 out through vent opening 26, until the downstream pressure has returned to the bias plus control pressure, again what is provided is a pressure equalization action on the diaphragm system.

It is normally desirable to have the relief valve arrangement crack at a pressure slightly above the summed bias and control pressure to prevent continuous bleeding of the regulator. The differential between the outlet pressure in the device flow mode and the pressure which must act upon the upper face of diaphragm 94 to relieve gas pressure through vent opening 26, is the range of tolerance between the lower and upper limits of the outlet pressure for a given control pressure. The pressure at which the relief valve arrangement cracks, which is the upper limit of this range of tolerance, can be adjusted through a combination of adjusting the degree of compression of helical spring 40 by means of screw 98, and small adjustments to the magnitude of fixed bias pressure in intermediate compartment 22I. If the valve spring 40 is compressed, a small adjustment increasing the bias pressure in intermediate compartment 22I is required to establish the outlet pressure at a given level above control pressure. As a consequence, more force acts on the lower side of diaphragm 94 so that the relief valve cracking pressure is increased. Releasing compression of the valve spring and lowering of the fixed bias pressure will decrease the cracking pressure. It is to be understood that the required adjustments in magnitude of the fixed bias pressure, are of a smaller order of magnitude than the value of bias pressure needed to provide a given outlet pressure, and therefore this combined adjustment constitutes a fine adjustment of the relief valve cracking pressure. Fine adjustment of the cracking pressure of the relief valve enables achievement of minimum range of pressure tolerance between the flow and relief modes of the device, for different magnitudes of fixed bias pressure.

Obviously many modifications and variations of the present invention are possible in the light of the above teachings. It is therefore to be understood that within the scope of the appended claims the invention may be practiced otherwise than as specifically described.

What is claimed is:

1. Unitary regulator valve and relief valve apparatus for installation in a pressurized fluid supply line for providing a reduced downstream supply line pressure which may be selectively varied in response to an independent variable control pressure, said apparatus comprising;
    (a) a valve housing having therein a line fluid inlet port, a line fluid outlet port, a control pressure inlet port,
    (b) said valve housing further having three axially aligned pressure chambers in axially spaced relationship, said chambers consisting of a regulator valve actuator chamber adjacent to one end of the valve housing, a relief valve chamber adjacent to the other end, and a bias chamber therebetween, said valve housing at the end thereof adjacent to the relief valve chamber having an axial vent outlet extending outwardly from the outer end wall of the relief valve chamber and opening into the exterior surface of the adjacent end of the valve housing,
    (c) a first movable wall associated with the regulator valve actuator chamber, and a second movable wall associated with the relief valve chamber, and third and fourth movable walls associated with the bias chamber,
    (d) said first movable wall disposed transversely across said regulator valve actuator chamber,
    (e) pressure reducing and regulating valve means for controlling the fluid supply line pressure and of the type operated by axial movement of said first movable wall, said valve means disposed at the end of the body member adjacent to the regulator valve actuator chamber, said valve means having a variable opening which increases in size under outward movement of said first movable wall and including resilient means urging the valve means toward its closed position.
    (f) said first movable wall dividing the regulator valve actuator chamber into an inner compartment adapted to have said variable control pressure applied thereto and into an outer output compartment having an associated conduit connection communicating same with output side of the valve means,
    (g) the outer end wall of the relief valve chamber having a coaxially aligned annular groove in radially spaced relationship about the vent outlet, said annular groove having an associated conduit connection communicating same with the output side of the valve means,
    (h) said second movable wall disposed transversely across the relief valve chamber adjacent its outer end wall but in non-sealing relationship thereto, said second movable wall defining an inner compartment of the relief valve chamber between its inner face and the inner end wall of the chamber, said inner compartment adapted to have said variable control pressure applied thereto,
    (i) the portion of the outer end wall of the relief valve chamber radially intermediate the annular groove and the vent outlet forming a face seating valve element which coperates with the outer face of the second movable wall to form a relief valve to relieve the pressure at the downstream side of the valve means in response to the force of the pressure at the downstream side of the valve means applied to the outer face of the second movable wall,
    (j) said third and fourth movable walls disposed transversely across said bias chamber dividing the bias chamber into an intermediate compartment sandwiched between a pair of outer compartments, said third and fourth movable walls being disposed adjacent the regulator valve actuator chamber and the relief valve chambers, respectively, said intermediate compartment being sealed and for containing fluid under fixed bias pressure, said pair of outer chambers for containing diaphragm equilibrium fluids under equal pressures,
    (k) first and second axial connector rod bores extending between the inner compartment of the regulator valve actuator chamber and the adjacent outer compartment of the bias chamber, and extending between the inner compartment of the relief valve chamber and the adjacent outer compartment of the bias chamber, respectively,
    (l) first and second connector rod means extending through the first and second axial slide bores, respectively, and operatively connecting the first and third movable walls and the second and fourth movable walls, respectively, said connector rod means each adapted for sealable sliding engagement with its associated bore,
    (m) whereby the operations of the pressure reducing and regulating valve means and relief valve automatically maintains the pressure at the output side of the pressure reducing and regulating valve means between lower and upper limits, respectively, the range of pressure tolerance between said lower and upper limits being small in relation to the magnitude of said fixed bias pressure of the fluid in the intermediate compartment of the bias chamber.

2. Apparatus in accordance with claim 1, and
    (n) means for selectively pre-adjusting the magnitude of the fixed bias pressure in the sealed intermediate compartment of the bias chamber,
    (o) and means for selectively pre-adjusting the magnitude of resilient force of the resilient means for urging the valve means toward its closed position, adjusting the magnitude of resiliency varying the magnitude of said fixed bias pressure needed to provide a desired fixed differential between the tolerance range and the variable control pressure, and varying such magnitude of fixed bias pressure in turn varying the magnitude of pressure at the output side of the pressure reducing and regulating valve means needed to crack the relief valve,
    (p) the combined adjustability of the cracking pressure of the relief valve and the bias pressure providing a fine adjustment of the upper limit of the range of pressure tolerances, thereby enabling achievement of a minimum range of pressure tolerance for different magnitudes of said fixed bias pressure.

3. Apparatus in accordance with claim 1, wherein said pressure reducing and regulating valve means comprises;

(q) an axially aligned pintle valve cavity formed in said valve housing intermediate the regulator valve actuator chamber and the adjacent end of the housing member, said pintle valve cavity being composed of three axial sections consisting of a pintle slide bore sections, a constricted section adjoining the inner end of the pintle slide bore section and forming an annular valve seat generally confronting same, and a valve expansion chamber section adjoining the inner end of the constricted section, said pintle slide bore section adapted to receive line fluid from the line fluid inlet port at a zone thereof adjoining its inner and through an associated conduit means, said valve expansion chamber section adapted to deliver line fluid to the line fluid outlet port at a zone thereof adjoining its inner end, (r) a pintle member slideably disposed in said pintle slide bore section of the pintle valve cavity, said pintle member having an annular valving surface formed on its inner end, for co-operation with said annular valve seat to form an annular valve passage therebetween which varies in passage cross-sectional area under movement of the pintle between different axial positions away from said valve seat surface, (s) an axially aligned helical compression spring disposed between the pintle and the outer end wall of the pintle valve cavity for urging the pintle toward the annular valve seat, the outer end of said spring being operatively connected to the linner end wall of the pintle valve cavity to bear thereaginst in thrust, and the inner end of the spring engaging said pintle, and (t) a third connector rod bore extending between the outer compartment of the bias chamber and the fluid expansion section of the pintle valve cavity, and a third connector rod means operatively connecting the first movable wall and the pintle, said connector rod means slidingly engaging and extending through said third connector rod bore.

4. Apparatus in accordance with claim 3, wherein;

(u) said pintle member is a hollow member having a cylinder central cavity therein which is open at the outer end thereof;

(v) means constraining the pintle member to rectilinear movement;

(w) an axially aligned collared lead screw having a large dimetered integral collar disposed adjacent its head, said lead screw being disposed in the inner slide bore section of the pintle cavity with its collar sealingly engaging the outer end wall of the pintle cavity and the screw head projecting into a central screw head access aperture between said outer end wall of the pintle cavity and the exterior surface of the valve housing, and having the threaded end of the screw projecting inwardly into the central cavity within the pintle member.

(x) a lead nut threaded onto the threaded end of the lead screw, (y) said helical compression spring concentrically disposed about the threaded end of the lead screw with its inner end engaging the end wall of the central space of the pintle member and secured thereto in a manner to prevent relative rotation therebetween, and with its outer end operatively connected to the lead nut to bear thereagainst in thrust, and secured thereto in a maner preventing relative totation therebetween.

5. Apparatus in accordance with claim 1 wherein;

(z) said first, second, third, and fourth movable walls each comprising a flexure diaphragm sealingly attached at its outer periphery to the lateral wall of the associated chamber, and each having an associated rigid thrust plate having a face thereof in adjoining juxtaposed relation to the flexure diaphragm.

References Cited

UNITED STATES PATENTS

| 2,663,121 | 12/1953 | Ramsey | 137—16.3 |
| 2,995,145 | 8/1961 | Heiser | 137—505.4 X |
| 3,234,960 | 2/1966 | Brumm | 137—510 |

ALAN COHAN, *Primary Examiner.*

U.S. Cl. X.R.

137—116.3, 510, 596.18